United States Patent
Nagao

(10) Patent No.: US 9,440,323 B2
(45) Date of Patent: Sep. 13, 2016

(54) MACHINE TOOL EQUIPPED WITH CHIP SCRAPER

(71) Applicant: FANUC Corporation, Yamanashi (JP)

(72) Inventor: Akihiko Nagao, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 71 days.

(21) Appl. No.: 14/178,435

(22) Filed: Feb. 12, 2014

(65) Prior Publication Data

US 2014/0234047 A1 Aug. 21, 2014

(30) Foreign Application Priority Data

Feb. 21, 2013 (JP) ................................ 2013-032259

(51) Int. Cl.
*B23Q 11/08* (2006.01)
(52) U.S. Cl.
CPC ........... *B23Q 11/0875* (2013.01); *B23Q 11/08* (2013.01); *Y10T 409/304088* (2015.01)
(58) Field of Classification Search
CPC .... B23Q 1/01; B23Q 1/017; B23Q 11/0042; B23Q 11/08; B23Q 11/0875; Y10T 409/134; Y10T 409/137
USPC ................................................ 409/134, 137
See application file for complete search history.

(56) References Cited

U.S. PATENT DOCUMENTS

| | | | | | |
|---|---|---|---|---|---|
| 1,938,786 | A | * | 12/1933 | Vancil | 384/13 |
| 1,991,177 | A | * | 2/1935 | Rutz et al. | 384/13 |
| 2,548,848 | A | * | 4/1951 | Stechmann | 384/15 |
| 3,030,692 | A | * | 4/1962 | Raynes | 82/154 |
| 3,515,444 | A | * | 6/1970 | Grabner | 384/15 |
| 3,751,120 | A | * | 8/1973 | Kietz | 384/15 |
| 5,377,379 | A | * | 1/1995 | Lo | 15/246 |
| 5,379,480 | A | * | 1/1995 | Lo | 15/246 |
| 5,807,043 | A | * | 9/1998 | Blank | 409/134 |
| 6,260,438 | B1 | * | 7/2001 | Tabellini | 74/612 |
| 6,623,011 | B1 | | 9/2003 | Ueda et al. | |
| 2014/0308087 | A1 | * | 10/2014 | Tullmann et al. | 409/134 |

FOREIGN PATENT DOCUMENTS

CN 101386083 B 2/2011
CN 202225016 U 5/2012

(Continued)

OTHER PUBLICATIONS

Office Action mailed Aug. 19, 2014, corresponding to Japanese patent application No. 2013-032259.

(Continued)

*Primary Examiner* — Sunil K Singh
*Assistant Examiner* — Ryan Rufo
(74) *Attorney, Agent, or Firm* — Hauptman Ham, LLP

(57) ABSTRACT

A machine tool includes a saddle supported by a guide member installed on a bed and configured to move relative to the bed in a first direction and a table supported by a guide member installed on the saddle and configured to move relative to the saddle in a second direction orthogonal to the first direction. The machine tool further includes a protective cover installed on a side face of the table or the saddle which is parallel to a travel direction of the table or the saddle and adapted to protect the guide member from chips and a scraper installed on the protective cover and adapted to scrape out chips built up in a neighborhood of the guide member.

2 Claims, 3 Drawing Sheets

(56) References Cited

FOREIGN PATENT DOCUMENTS

| DE | 9309861 U1 * | 9/1993 | ......... B23Q 11/0875 |
|---|---|---|---|
| DE | 202011108058 U1 | 1/2012 | |
| JP | 4616866 U | 6/1971 | |
| JP | 614644 A | 1/1986 | |
| JP | 61154645 U | 9/1986 | |
| JP | 360950 A | 3/1991 | |
| JP | 5-228782 A | 9/1993 | |
| JP | 2004-106066 A | 4/2004 | |
| WO | 00/61332 A1 | 10/2000 | |

OTHER PUBLICATIONS

Office Action mailed May 27, 2014, corresponds to Japanese patent application No. 2013-032289.

Office Action dated Jun. 9, 2015, corresponding to Chinese patent application No. 201410056710.6.

Office Action in DE Application No: 102014102071.5, dated Feb. 5, 2016.

* cited by examiner

MACHINE TOOL EQUIPPED WITH CHIP SCRAPER

RELATED APPLICATIONS

The present application claims priority to Japanese Application Number 2013-032259, filed Feb. 21, 2013, the disclosure of which is hereby incorporated by reference herein in its entirety.

BACKGROUND OF THE INVENTION

1. Field of the Invention

The present invention relates to a machine tool, and more particularly, to a machine tool equipped with a member adapted to scrape out chips built up on part of the machine tool.

2. Description of the Related Art

In a machine tool, as a method for scraping out chips built up on part of the machine, it is common practice to use a wiper or a scraper plate. Regarding chips which cannot be scraped out by a wiper, a method is available which washes away the chips by supplying lubricating oil to a space formed for use as a flow path for lubricating oil. The conventional technique described above is disclosed, for example, in Japanese Patent Application Laid-Open Nos. 5-228782 and 2004-106066.

With the technique disclosed in Japanese Patent Application Laid-Open No. 5-228782 described above, in order to completely scrape out the chips built up on the machine, it is necessary to move a table to the farthest end of a motion range. In actual machining, the table is rarely moved to the farthest end of the motion range, and it is very likely that chips will just keep on building up.

Also, the technique disclosed in Japanese Patent Application Laid-Open No. 2004-106066, according to which the wiper is placed in contact with a sliding surface, is expected to achieve the effect of keeping out chips. However, to remove chips which have once entered a space on the inner side of the wiper, there is no way but to wash away the chips by lubricating oil, which is disadvantageous in that a complicated large-scale structure is required. Also, even if lubricating oil is present, abrasion of the wiper due to pinching of chips or due to sliding is unavoidable and periodic parts replacement is necessary. If periodic parts replacement is neglected, there is a problem in that a clearance will be produced, allowing chips to enter.

SUMMARY OF THE INVENTION

Thus, an object of the present invention is to provide a machine tool equipped with a trouble-free chip scraper of simple construction at reduced costs in order to solve the problem with the conventional technique described above.

To achieve the object of the present invention, the following configuration is adopted. A chip intrusion prevention cover adapted to prevent chips from entering a drive is fixed to a table or saddle and a chip scraper is fixed to the cover. When the table or saddle moves, the chip scraper also moves along with the table or saddle. In so doing, chips built up near a linear-motion guide by entering inside the chip intrusion prevention cover through a clearance between the cover and saddle or between the cover and bed are scraped out of the cover.

With this approach, the chip scraper, which is out of contact with the saddle or bed, has no sliding resistance, and thus there is no concern that the chip scraper will be abraded, which makes the chip scraper free of maintenance. Also, if plural chip scrapers are installed and their fixing positions are adjusted individually, the effect of scraping out chips can be achieved even if travel distances are short, making it possible to scrape out chips stably. Furthermore, a simple construction makes the chip scraper free of trouble while keeping down costs.

The present invention provides a machine tool which includes: a saddle supported by a guide member installed on a bed and configured to move relative to the bed in a first direction; and a table supported by a guide member installed on the saddle and configured to move relative to the saddle in a second direction orthogonal to the first direction. The machine tool machines a workpiece through relative movement between a tool mounted on a spindle and the workpiece set on the table. The machine tool further includes a protective cover installed on a side face of the table or the saddle which is parallel to a travel direction of the table or the saddle and adapted to protect the guide member from chips; and a scraper installed on the protective cover and adapted to scrape out chips built up in a neighborhood of the guide member.

The scraper may be installed at plurality of locations differing in position in the travel direction of the table or the saddle or in position in a height direction.

The present invention makes it possible to provide a machine tool equipped with a trouble-free chip scraper of simple construction at reduced costs.

BRIEF DESCRIPTION OF THE DRAWINGS

The above and other objects and features of the present invention will become more apparent from the following description of the embodiment taken in conjunction with the accompanying drawings, wherein.

DETAILED DESCRIPTION OF THE PREFERRED EMBODIMENT

Figure 1:
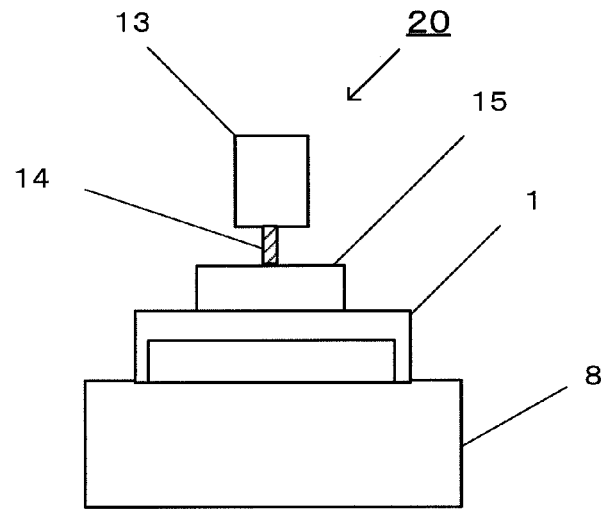
FIG. 1 is a schematic front view showing a machine tool according to an embodiment of the present invention.

A machine tool according to an embodiment of the present invention will be described with reference to FIGS. 1 and 2.

A machine tool 20 is supported by a guide member (not shown) installed on a bed 8. The machine tool 20 includes a saddle 5 (FIG. 2) configured to move in a first direction relative to the bed 8 and a table 1 configured to move relative to the saddle 5 in a second direction orthogonal to the first direction, being supported by a guide member (described later) installed on the saddle 5. The machine tool machines a workpiece 15 through relative movement between a tool 14 mounted on a spindle 13 and the workpiece 15 set on the table 1.

Figure 2:
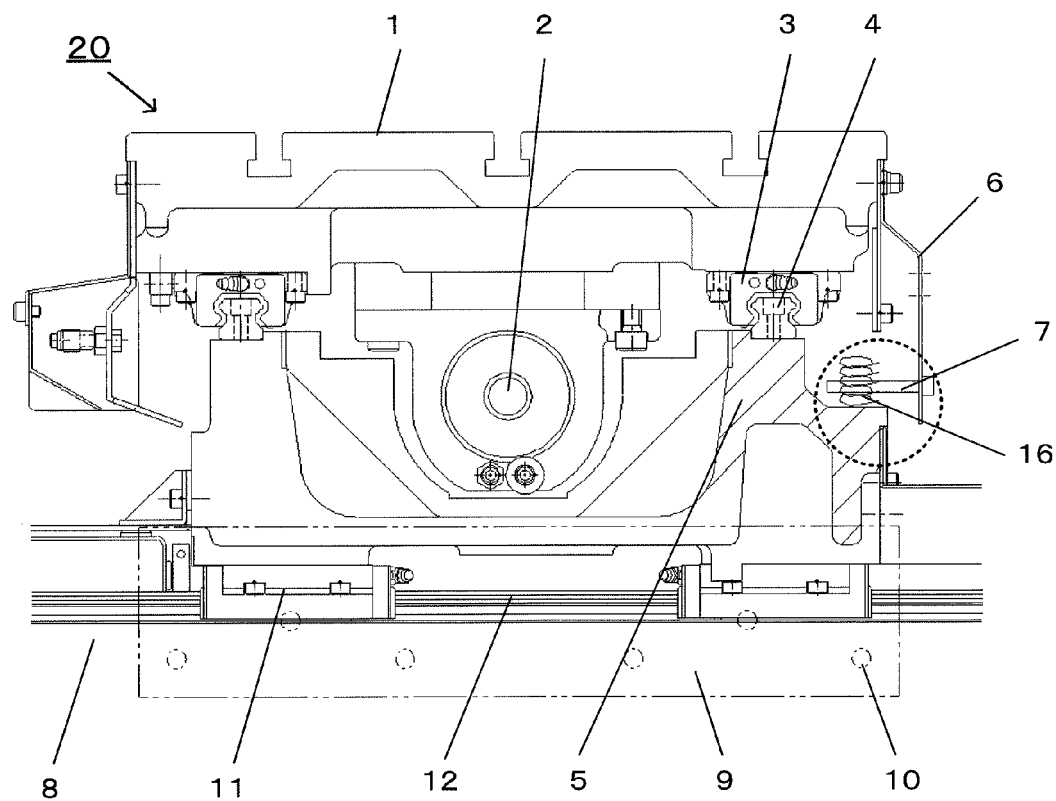
FIG. 2 is a sectional view of a saddle portion of the machine tool shown in FIG. 1.
Figure 3:
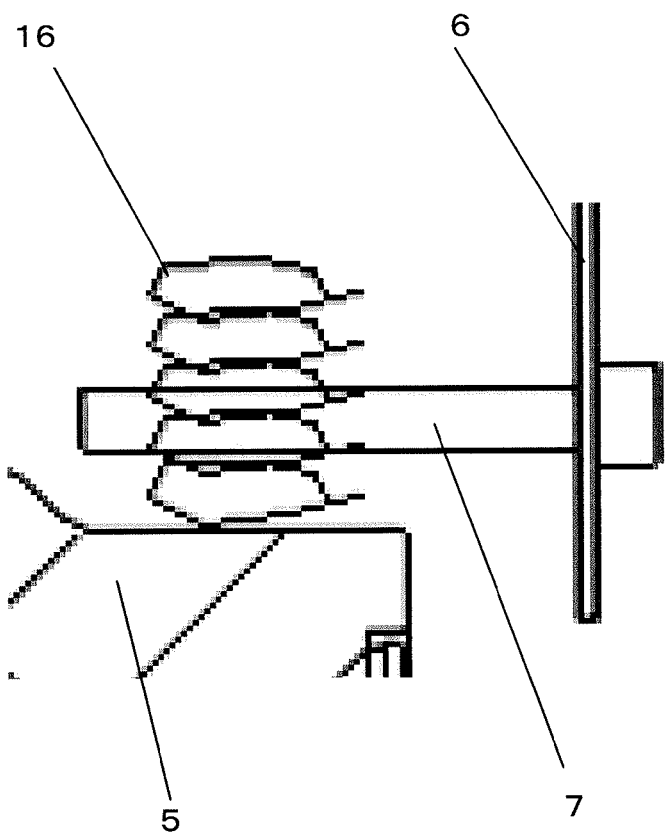
FIG. 3 is an enlarged view of an area indicated by a broken line in FIG. 2.

As shown in FIG. 2, a Y-axis guide rail 12 is mounted on the bed 8, and the saddle 5 is supported by a Y-axis guide block 11 moving along the Y-axis guide rail. An X-axis guide rail 4 is mounted on top of the saddle 5, and the table 1 is supported by an X-axis guide block 3 moving along the X-axis guide rail 4. The saddle 5 is equipped with a nut (not shown), which is threadedly engaged with an X-axis ball screw 2 such that the saddle 5 will move when the X-axis ball screw 2 is turned. A set of the X-axis guide block 3 and X-axis guide rail 4 makes up a guide member adapted to support the table 1. Also, a set of the Y-axis guide block 11 and Y-axis guide rail 12 makes up a guide member adapted to support the saddle 5.

A protective cover which protects the guide member (X-axis guide block 3 and X-axis guide rail 4) adapted to support the table 1 from chips 16 is an X-axis chip intrusion prevention cover 6 while a protective cover which protects the guide member (Y-axis guide block 11 and Y-axis guide rail 12) adapted to support the saddle 5 is a Y-axis chip intrusion prevention cover 9.

An X-axis chip scraper 7 is mounted on the X-axis chip intrusion prevention cover 6. The X-axis chip scraper 7 scrapes out chips 16 built up near the guide member (X-axis guide block 3 and X-axis guide rail 4) which supports the table 1. On the other hand, a Y-axis chip scraper 10 is mounted on the Y-axis chip intrusion prevention cover 9. The Y-axis chip scraper 10 scrapes out chips built up near the guide member (Y-axis guide block 11 and Y-axis guide rail 12) which supports the saddle 5.

Specifically, the chips 16 produced as a result of machining are built up on a saddle surface near the X-axis guide block 3 and X-axis guide rail 4 which support the table 1, by passing through a clearance between the saddle 5 and X-axis chip intrusion prevention cover 6 as well as built up near the Y-axis guide block 11 and Y-axis guide rail 12 which support the saddle 5, by passing through a clearance between the bed 8 and Y-axis chip intrusion prevention cover 9. However, in the following, description will be given only of removal of the chips 16 built up on the saddle surface near the X-axis guide block 3 and X-axis guide rail 4 which support the table 1.

To remove the chips 16 built up on the saddle surface near the X-axis guide block 3 and X-axis guide rail 4 which support the table 1, the X-axis chip scraper 7 is mounted on the X-axis chip intrusion prevention cover 6. Then, when the table 1 moves, the X-axis chip scraper 7 moves together, making it possible to scrape out the chips 16 built up on the saddle surface and discharge the chips 16 through a space located on an extension in a travel direction or through a clearance between the saddle 5 and the X-axis chip intrusion prevention cover 6.

Figure 4:
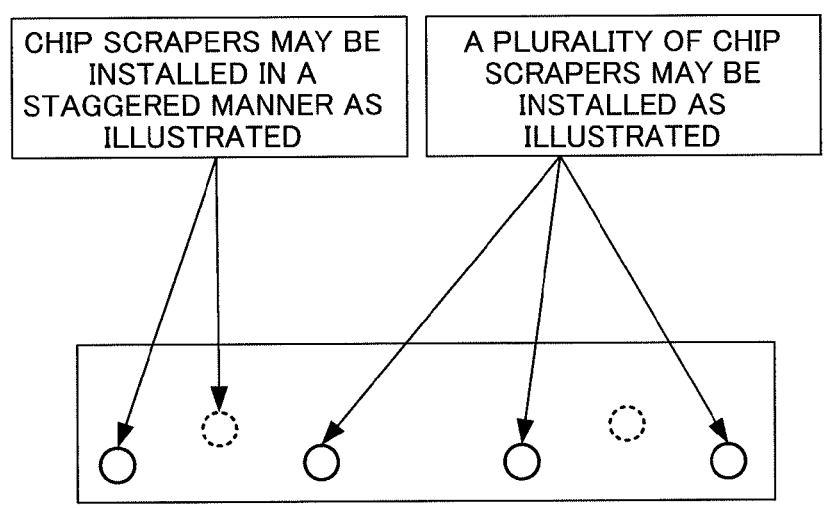
FIG. 4 is a diagram illustrating fixing positions of a chip scraper shown in FIG. 2 on a protective cover.
Figure 5A:
FIGS. 5A to 5F show exemplary shapes of the chip scraper.
Figure 5A:
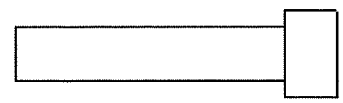
Figure 5B:
Figure 5B:
Figure 5C:
Figure 5C:
Figure 5D:
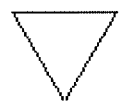
Figure 5D:
Figure 5E:
Figure 5E:
Figure 5F:
Figure 5F:
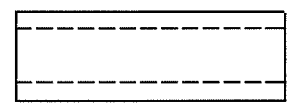

FIG. 4 is a diagram illustrating fixing positions of the chip scrapers 7 and 10. In mounting the chip scrapers 7 and 10 on the chip intrusion prevention covers 6 and 9, positions of the chip scrapers 7 and 10 are adjustable in travel direction and height direction as well as in terms of distances from the guide members (3 and 4; 11 and 12). Also, since the plural chip scrapers 7 and 10 can be used, a mutual positional relationship between the chip scrapers 7 and 10, a distance from the saddle surface, and the distances from the guide members can be set as desired, and even when a travel distance of the table 1 is short, the chip scrapers 7 and 10 can be laid out in such a way as to be most effective in chip discharge. The chip scrapers 7 and 10 may be installed on opposite sides of the table 1. Also, instead of being mounted on the chip intrusion prevention covers 6 and 9, the chip scrapers 7 and 10 may be fixed directly to the table 1, allowing mounting locations to be adjusted.

FIGS. 5A to 5F show exemplary shapes of the chip scrapers 7 and 10. Chip scrapers with various cross-sectional shapes are available for use.

Although a technique for removing the chips 16 built up on the saddle surface near the X-axis guide block 3 and X-axis guide rail 4 which support the table 1 has been described above, the technique can be applied directly to a technique for removing the chips 16 built up near the Y-axis guide block 11 and Y-axis guide rail 12 which support the saddle 5.

What is claimed is:

1. A machine tool, comprising:
   a saddle supported by a first guide member installed on a bed and configured to move relative to the bed in a first direction; and
   a table supported by a second guide member installed on the saddle and configured to move relative to the saddle in a second direction orthogonal to the first direction, wherein
   the machine tool is configured to machine a workpiece through relative movement between a tool mounted on a spindle and the workpiece set on the table, the machine tool further comprising:
   a protective cover installed on a side face of the table or the saddle which is parallel to a travel direction of the table or the saddle and adapted to protect the first or second guide member from chips; and
   a scraper installed on the protective cover, out of contact with the saddle or the bed, and adapted to scrape out chips built up on a surface of the saddle or on a surface of the bed along the first or second guide member, by relative movement of the table with respect to the saddle in the second direction or by relative movement of the saddle with respect to the bed in the first direction,
   wherein a lower end of the cover is below the second guide member, and the scraper is arranged above the lower end of the cover for scraping out the chips built up on the surface of the saddle.

2. The machine tool according to claim 1, wherein the scraper is installed at a plurality of locations differing in position in the travel direction of the table or the saddle or in position in a height direction.

* * * * *